UNITED STATES PATENT OFFICE.

ADOLPH LIEBMANN, OF MANCHESTER, ENGLAND.

MONOSULPHO-ACID OF ALPHA-NAPHTHOL.

SPECIFICATION forming part of Letters Patent No. 374,259, dated December 6, 1887.

Application filed May 25, 1887. Serial No. 239,292. (Specimens.)

*To all whom it may concern:*

Be it known that I, ADOLPH LIEBMANN, of Manchester, England, have invented a new and useful Monosulpho-Acid of Alpha-Naphthol, of which the following is a full, true, and exact description.

One part, by weight, of alpha-naphthol is mixed with four parts, by weight, of concentrated sulphuric acid, 170° to 185° temperature, and then heated for about one hour at 130° centigrade. The resulting mixture of sulpho-acids is converted into their corresponding barium salts. This mixture of barium salts is then suspended in about ten parts of water, and gaseous hydrochloric acid is passed into this mixture of barium salts and water until saturated. Then I heat this mixture for about two hours in connection with a reversed condenser, evaporate the excess of hydrochloric acid on the water-bath, dissolve the residue in water, and filter off the precipitate of barium sulphate which has been formed by the action of hydrochloric acid on barium sulphonates. Then I neutralize the solution of the new sulpho-acid with barium carbonate, and on evaporation of the barium solution I obtain the dry barium salt, which can be further purified by recrystallization. The barium salt is soluble in water and dilute ethyl alcohol.

This new sulpho-acid, which is, as stated, a monosulpho-acid, has remarkable properties, by which it can be easily distinguished from all other monosulpho acids of alpha-naphthol. It does not on nitration lose its sulpho group, but yields, on treatment with nitric acid, dinitrosulpho-alpha-naphthol, which none of the hitherto-known monosulpho-acids of alpha-naphthol does, and this reaction forms a striking difference between my sulpho-acid and the known ones. It combines with diazo compounds and forms valuable dye-stuffs, by which reaction it can be readily distinguished from the known di and tri sulpho-acid of alpha-naphthol.

I do not confine myself to the method above mentioned. The same result can be achieved in different ways. I can modify the strength of sulphuric acid used for the first step, taking fuming sulphuric acid instead of ordinary concentrated acid, and I can vary the temperature and duration accordingly. I can also decompose the barium salts with hydrochloric acid in closed vessels by heating, for instance, one part of the barium salts with two parts of hydrochloric acid for two hours, between 140° and 150° centigrade, or even by heating the crude mixture of the sulpho-acids and sulphuric acid after dilution with a little water by themselves, or after passing hydrochloric acid into it; but I find that the specified method gives me the best result.

What I claim as my invention, and desire to secure by Letters Patent, is—

The new monosulpho-acid of alpha-naphthol with the properties specified above.

In testimony whereof I have signed my name to this specification in the presence of two subscribing witnesses.

AD. LIEBMANN.

Witnesses:
   ANTHONY GREF,
   WM. A. POLLOCK.